(No Model.)   J. W. LIVERMORE.   2 Sheets—Sheet 1.
FEEDER FOR THRESHING MACHINES.

No. 570,257.   Patented Oct. 27, 1896.

(No Model.)
2 Sheets—Sheet 2.

J. W. LIVERMORE.
FEEDER FOR THRESHING MACHINES.

No. 570,257.
Patented Oct. 27, 1896.

UNITED STATES PATENT OFFICE.

JOHN W. LIVERMORE, OF KINGSBURG, CALIFORNIA.

FEEDER FOR THRESHING-MACHINES.

SPECIFICATION forming part of Letters Patent No. 570,257, dated October 27, 1896.

Application filed March 16, 1896. Serial No. 583,305. (No model.)

*To all whom it may concern:*

Be it known that I, JOHN W. LIVERMORE, a citizen of the United States, residing at Kingsburg, county of Fresno, State of California, have invented an Improvement in Feeders for Threshing-Machines; and I hereby declare the following to be a full, clear, and exact description of the same.

My invention relates to a mechanism for feeding unthreshed straw to threshing-cylinders of machines which may be either stationary or applied to traveling harvesters.

It consists in certain details of construction which will be more fully explained by reference to the accompanying drawings, in which—

Figure 1:
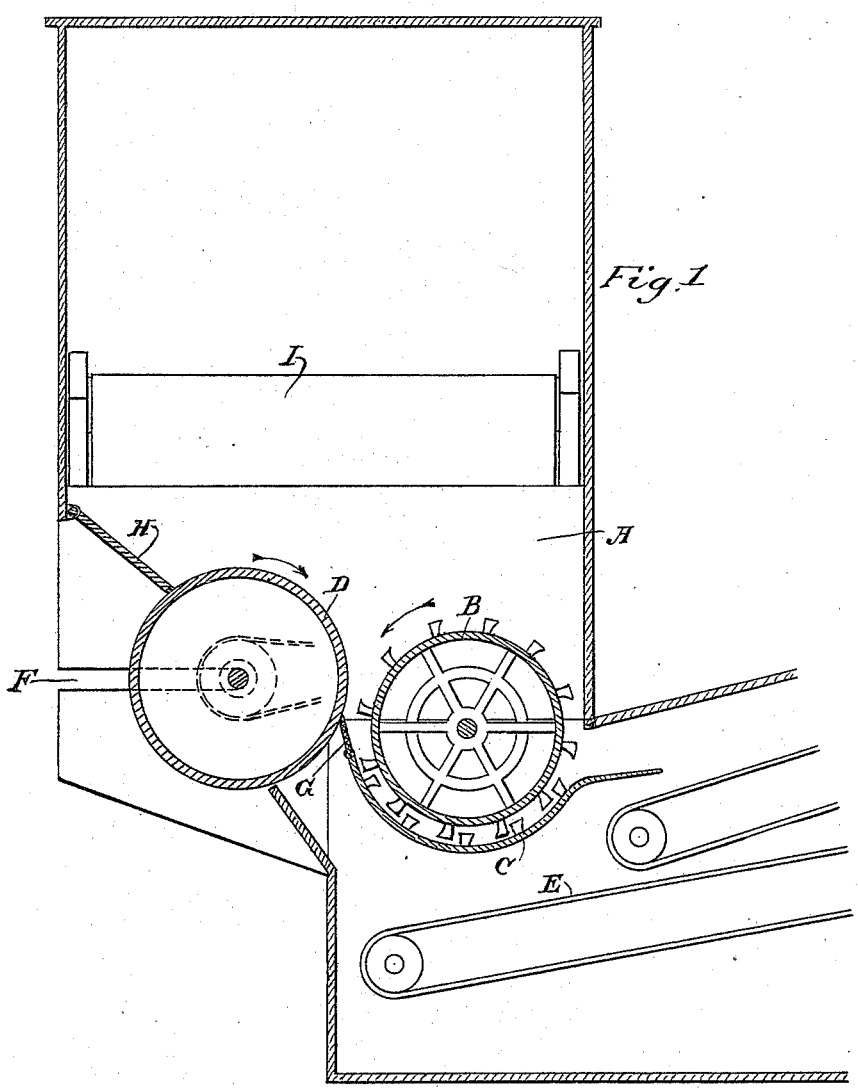
Figure 2:
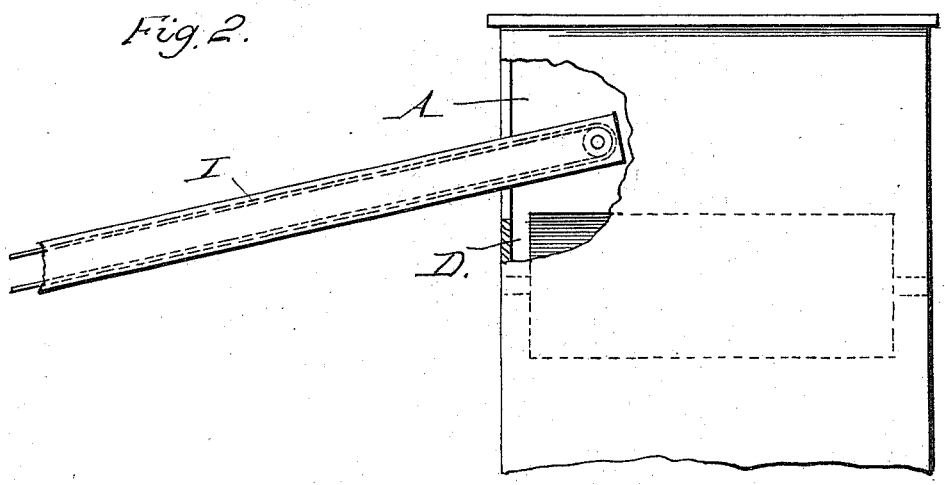
Figure 3:
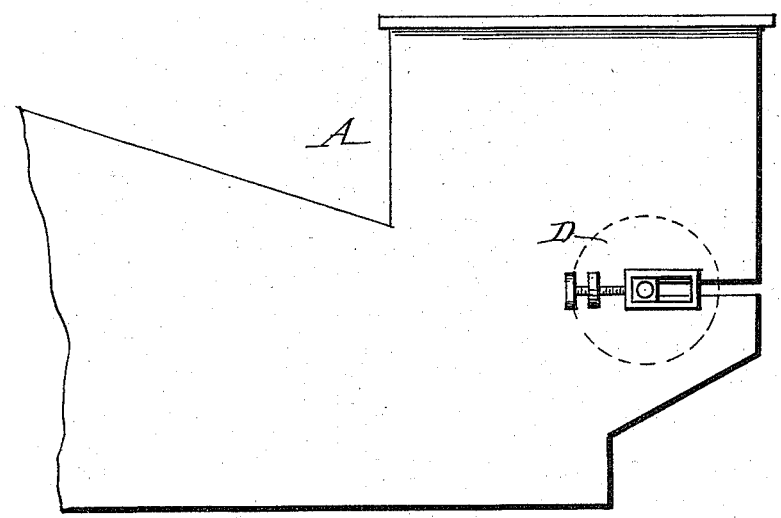

Figure 1 is a vertical section through the feeder-case and the threshing and feed cylinders. Fig. 2 is an elevation at right angles to Fig. 1, showing a portion of the feeder-house and an edge view of a portion of the carrying-belt. Fig. 3 is a detail showing a means for adjusting the roller D.

A is the feeder-house, which is in the form of a rectangular structure, built upon a machine and inclosing the threshing-cylinder B with its concave C and the feed-cylinder D, which is journaled in front of the threshing-cylinder.

The threshing cylinder and concave may be of any well-known and suitable form adapted to deliver the threshed products upon the carrying-belt E, which removes them to the rear separating and cleaning portion of the machine.

The feed-cylinder D is of about the same diameter as the extreme diameter of the threshing-cylinder, and its journal may be about four or five inches above the level of the threshing-cylinder journals, at which point I have found it to work very well. I do not desire, however, to limit the position further than that it is at the front of the threshing-cylinder.

The journal-boxes are movable in horizontal slots or channels F, made in the sides of the feeder-house, so that it can be moved nearer to or farther from the threshing-cylinder.

From the front edge of the concave a flexible strip G extends upward, having its free end chamfered off, as shown, so as to form contact with the smooth periphery of the feed-cylinder and prevent the straw and grain from dropping down between the two.

From the side of the feeder-house above and in front of the feed-cylinder is a similar inclined plate H, the lower edge of which contacts with the periphery of the feed-cylinder, so that the grain and straw which are delivered into the feeder-house by the carrying-belt I will fall upon the tops of the feed and threshing cylinders, as shown.

The threshing-cylinder may have a velocity of upward of a thousand revolutions per minute. The feed-cylinder is rotated at about eighty revolutions.

The operation will then be as follows: Grain and straw are brought by the feeder-belt I from the source of supply, either the stack or header-wagon when the threshing-machine is a stationary one or directly from the header-sickle when it is a traveling harvester. This unthreshed straw is delivered into the upper part of the feeder-house A and falls upon the top of the two cylinders. The rapid rotation of the threshing-cylinder draws the straw in between its teeth and those of the concave and threshes it in the usual manner. The feed-cylinder acts as a check to prevent the straw passing in too rapidly, and it regulates the feed perfectly, so that all large masses will be distributed and delivered gradually, and the threshing will be evenly and well done.

Any adjustment between the two cylinders is made by moving the feed-cylinder journal-boxes in the channels in which they are movable so as to bring the cylinder nearer to or farther from the threshing-cylinder.

Whenever it is necessary to obtain access to the interior of the apparatus, the belt which drives the feed-cylinder is removed, and the cylinder may be withdrawn entirely from the feed-house by opening the side thereof. The threshing-cylinder is then fully exposed and easily accessible for the tightening or replacing of teeth or other repairs.

Having thus described my invention, what I claim as new, and desire to secure by Letters Patent, is—

1. A feed apparatus for threshing-machines, consisting of a smooth-faced cylinder journaled in front of the threshing-cylinder, with means for rotating it, a feeder-belt adapted to deliver the straw above the feed and threshing cylinders, an inclosed box or house within which the two cylinders rotate and within which the discharge end of the feeder-belt is contained, a flexible plate extending from the front end of the threshing-concave and forming contact with the periphery of the feed-cylinder, a corresponding inclined plate extending from the front side of the feeder-house and forming contact with the upper front portion of the feed-cylinder.

2. In a threshing-machine, a threshing cylinder and concave, a smooth-faced feed-cylinder adapted to rotate in front of the threshing-cylinder, a feeder-belt, the discharge end of which is situated above the two cylinders, flexible contact-plates extending from the edge of the threshing-concave to the face of the feed-cylinder on one side, and from the side of the inclosing box to the feed-cylinder surface upon the opposite side, horizontal slots or channels within which the journal-boxes of the feed-cylinder are movable to adjust it to or from the threshing-cylinder.

In witness whereof I have hereunto set my hand.

JOHN W. LIVERMORE.

Witnesses:
GEO. H. STRONG,
S. H. NOURSE.